A. F. PEETERS.
GLASS FURNACE.
APPLICATION FILED APR. 4, 1918.
1,366,745. Patented Jan. 25, 1921.
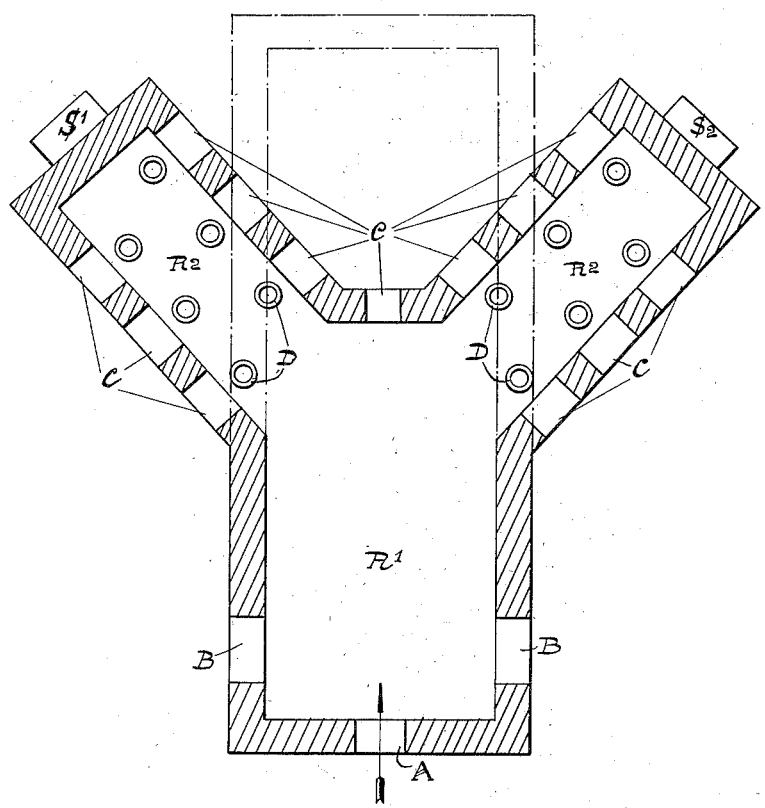
Alexander Franz Peeters.
Inventor
Attorney

UNITED STATES PATENT OFFICE.

ALEXANDER FRANZ PEETERS, OF LEERDAM, NETHERLANDS, ASSIGNOR TO NAAM-LOOZE VENNOOTSCHAP GLASFABRIEK LEERDAM, OF LEERDAM, NETHERLANDS, A COMPANY ORGANIZED UNDER THE LAWS OF THE NETHERLANDS.

GLASS-FURNACE.

1,366,745.     Specification of Letters Patent.     Patented Jan. 25, 1921.

Application filed April 4, 1918. Serial No. 226,765.

*To all whom it may concern:*

Be it known that I, ALEXANDER FRANZ PEETERS, a subject of the Queen of the Netherlands, residing at Leerdam, the Netherlands, have invented certain new and useful Improvements in Glass-Furnaces, of which the following is a specification.

The known glass-furnaces, wherein the raw materials are melted down directly on the bottom, (so-called tank-furnaces) may either be arranged so that the hot gases for melting the batch and heating the molten glass to the required temperature are led through the furnace in a continuous stream from the burners to the chimney, or in such a manner, that the flow of said gases is alternated at intervals, as is the case in all furnaces built in accordance with the regenerative principle of Siemens.

The present invention relates to both types of furnaces, but more especially to those furnaces wherein the flow of gases is continuous.

All said furnaces have two distinct portions, viz. the so-called "melting-space" with the inlet for the hot gases or for the liquid fuel, and in which the solid raw materials are converted into the liquid condition, and the so-called "working-space," to which flows the molten glass from the melting-space, and from which the glass is taken up by the workmen.

The furnaces hitherto proposed generally have in horizontal section the shape of a rectangle; this however has the objectionable feature that the stream of very hot gases flowing through the melting-space causes the temperature in the working-space to rise to a degree which is materially higher than is required for the manufacture of glass ware, which means a mere waste of fuel. This disadvantageous feature might be obviated by making the working-space comparatively long so as to bring at least some portions of the molten mass at a sufficient distance from the point where the temperature is highest, but this causes a very unequal distribution of heat in the working-space.

According to the present invention the above objectionable features may wholly or at least in part be obviated by a special construction of the furnace, whereby the hot combustion gases have to keep two or more working-spaces to the required high temperature, that is to say, by directly connecting with the melting-space two or more working-spaces.

The annexed drawing illustrates somewhat diagrammatically and in a horizontal section a glass-furnace built in accordance with the present invention.

In this drawing: $R^1$ is the melting-space, A is the inlet of the flame, B are the feed openings for the raw materials. The two working-spaces are indicated by $R^2$, the working-openings by C, the floaters or the like by D, the flues by $S^1$ and $S^2$. The working spaces or compartments $R^2$ are permanently in free communication with the melting space or compartment both above and below the glass level, and they diverge from the said melting space, as shown, their longitudinal axes forming angles of considerably less than 90° with the longitudinal axis of the melting space, so that the furnace as a whole has the shape of a Y in horizontal section.

Owing to the new construction, the heating of the working-space per unit of surface is reduced without the distance between the front walls of the melting space and the working-spaces being increased.

Moreover, the new construction offers the advantage, that its circumference is greater than that of a furnace having in horizontal section the usual rectangular shape. The drawing shows the superposition of a furnace built in accordance with the present invention with a furnace of the old construction, the latter being indicated in dotted lines and having the same holding capacity as the new one. It will readily be seen that the new furnace has a greater circumference than the old one, so that it allows of a greater number of working-openings being arranged in its walls.

The invention is applicable not only in cases wherein the flow of hot gases is continuous, as in the furnace shown in the drawing, but as well in those cases, wherein the hot gases entering at the side of the melting-space circulate through this space and through the working-space, and finally return into the melting-space for being discharged, as also in the case, wherein the inlet of the hot gases is at the side of the working-space, and the outlet at the side of the melting space.

Having now particularly described and ascertained the nature of my said invention and in what manner the same is to be performed, I declare that what I claim is:

1. A glass furnace, comprising a single melting compartment, and a pair of separate working compartments diverging from one end of the melting compartment and being in permanent, free communication with the melting compartment both above and below the glass level, the longitudinal axes of the working compartments forming angles of considerably less than 90° with the longitudinal axis of the melting compartment; the walls of said melting and working compartments being formed with openings for the inlet and outlet of the hot gases, and the two side walls of each working compartment being formed with working openings.

2. A glass furnace, comprising a single melting compartment, and a pair of separate working compartments diverging from one end of the melting compartment and being in permanent, free communication with the melting compartment both above and below the glass level, the longitudinal axes of the working compartments forming angles of considerably less than 90° with the longitudinal axis of the melting compartment; the two side walls of each working compartment being formed with working openings.

In testimony whereof I have affixed my signature in presence of two witnesses.

ALEXANDER FRANZ PEETERS.

Witnesses:
PLAUTE FÉLURE,
H. VESKEYE.